United States Patent
Bryan

(10) Patent No.: US 11,663,112 B2
(45) Date of Patent: May 30, 2023

(54) SELECTION OF COMPUTER SYSTEM DEPLOYMENTS TO MOCK FOR TESTING

(71) Applicant: EMC IP Holding Company LLC, Hopkinton, MA (US)

(72) Inventor: Matthew Bryan, Olympia, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 184 days.

(21) Appl. No.: 17/077,742

(22) Filed: Oct. 22, 2020

(65) Prior Publication Data
US 2022/0129366 A1      Apr. 28, 2022

(51) Int. Cl.
G06F 11/36      (2006.01)
G06F 8/60       (2018.01)

(52) U.S. Cl.
CPC ............ *G06F 11/3664* (2013.01); *G06F 8/60* (2013.01)

(58) Field of Classification Search
CPC ................................ G06F 8/60; G06F 11/3664
See application file for complete search history.

(56) References Cited

U.S. PATENT DOCUMENTS

| | | | |
|---|---|---|---|
| 6,748,429 B1 | 6/2004 | Talluri et al. | |
| 7,478,385 B2 | 1/2009 | Sierer et al. | |
| 7,703,070 B2 * | 4/2010 | Bisceglia | G06F 11/3664 717/101 |
| 7,865,888 B1 * | 1/2011 | Qureshi | G06N 5/048 717/170 |
| 8,418,150 B2 | 4/2013 | Thirumalai et al. | |
| 8,533,704 B2 | 9/2013 | Wookey | |
| 8,819,673 B1 | 8/2014 | Wilkinson et al. | |
| 9,477,454 B2 | 10/2016 | Scheiner et al. | |
| 10,031,783 B2 | 7/2018 | Jalagam et al. | |
| 10,467,059 B2 | 11/2019 | Derler et al. | |

(Continued)

OTHER PUBLICATIONS

Daniels et al., "Learning the Threshold in Hierarchical Agglomerative Clustering", published by IEEE 2006, Proceedings of the 5th International Conference on Machine Learning and Applications (ICMLA'06), pp. 1-6 (Year: 2016).*

(Continued)

*Primary Examiner* — S. Sough
*Assistant Examiner* — Zheng Wei
(74) *Attorney, Agent, or Firm* — Amin, Turocy & Watson, LLP

(57) ABSTRACT

Systems and methods facilitating selection of computer system deployments to mock for testing are described herein. A method as described herein can include filtering, by a first system operatively coupled to a processor, data relating to deployments of respective second systems as collected from the respective second systems, wherein the filtering is based on relevancy of the deployments to a testing criterion and results in a filtered group of deployments; grouping, by the first system, respective ones of the filtered group of deployments into respective clusters according to a difference function, the difference function being defined according to respective properties of the respective ones of the filtered group of deployments; and designating, by the first system, selected ones of the filtered group of deployments from respective ones of the clusters for testing according to a selection criterion.

20 Claims, 9 Drawing Sheets

(56) References Cited

U.S. PATENT DOCUMENTS

| | | | |
|---|---|---|---|
| 10,579,966 | B1 | 3/2020 | Willson et al. |
| 2005/0289228 | A1 | 12/2005 | Srikanth et al. |
| 2006/0020908 | A1 | 1/2006 | Jain et al. |
| 2007/0118560 | A1 | 5/2007 | Bornhoevd et al. |
| 2008/0127084 | A1* | 5/2008 | Sattler .............. G06F 9/44505 717/121 |
| 2009/0063225 | A1 | 3/2009 | Baeyens et al. |
| 2010/0064035 | A1* | 3/2010 | Branca ................ G06F 8/61 709/224 |
| 2011/0047527 | A1 | 2/2011 | Bird et al. |
| 2011/0265081 | A1 | 10/2011 | Lucovsky et al. |
| 2012/0117560 | A1 | 5/2012 | Vorthmann et al. |
| 2012/0144044 | A1* | 6/2012 | Verma ................. G06F 8/61 709/227 |
| 2015/0370235 | A1* | 12/2015 | Lloyd .................. G06F 8/64 700/79 |
| 2016/0239280 | A1* | 8/2016 | Scheiner .............. G06F 8/60 |
| 2017/0201569 | A1* | 7/2017 | Fu ..................... G06F 9/45558 |
| 2018/0039486 | A1 | 2/2018 | Kulkarni et al. |
| 2019/0036765 | A1 | 1/2019 | Ghosal et al. |
| 2019/0294528 | A1* | 9/2019 | Avisror ............... G06F 11/3688 |
| 2020/0045116 | A1 | 2/2020 | Deodhar et al. |
| 2020/0183811 | A1* | 6/2020 | Krishnan ............ G06F 11/3688 |
| 2020/0342068 | A1* | 10/2020 | Cai ................... G06F 30/20 |
| 2021/0011840 | A1 | 1/2021 | Zhou |
| 2021/0194803 | A1 | 6/2021 | Zolkover et al. |
| 2022/0035733 | A1 | 2/2022 | Zhu et al. |
| 2022/0131763 | A1* | 4/2022 | Kuwahara ............ G06F 8/60 |

OTHER PUBLICATIONS

Non-Final Office Action received for U.S. Appl. No. 17/074,019 dated Feb. 17, 2022, 24 pages.

Notice of Allowance received for U.S. Appl. No. 17/078,885 dated Jul. 21, 2022, 27 pages.

Spillner J., "Transformation of Python Applications into Function-as-a-Service Deployments", arXiv:1705.08169v1, Aug. 20, 2018, 14 pages.

Notice of Allowance received for U.S. Appl. No. 17/074,019 dated Jun. 13, 2022, 27 pages.

Nash et al., "Composition of Mappings Given by Embedded Dependencies", ACM Transactions on Database Systems, vol. 32, No. 1, Mar. 2007, 51 pages.

Siasi et al., "Container-Based Service Function Chain Mapping", 2019 SoutheastCon, Apr. 2019, 6 pages.

Dolstra E., "Integrating Software Construction and Software Deployment", Software Configuration Management (SCM), Springer-Verlag Berlin Heidelberg, 2003, pp. 102-117.

Notice of Allowance received for U.S. Appl. No. 17/078,885 dated Sep. 16, 2022, 26 pages.

Notice of Allowance received for U.S. Appl. No. 17/074,019 dated Sep. 14, 2022, 7 pages.

\* cited by examiner

SELECTION OF COMPUTER SYSTEM DEPLOYMENTS TO MOCK FOR TESTING

TECHNICAL FIELD

The subject application is related to computer system testing, and more particularly, to techniques for recreating a deployment of a computer system for the purposes of testing.

BACKGROUND

Some computing systems, such as commercial network-attached storage (NAS) systems or the like, can be implemented with a high degree of flexibility and/or scalability in order to better tailor a particular computing system to the needs of a specific customer. For instance, different implementations of a computing system can vary significantly in size (e.g., number of computing devices or clusters, etc.), software features, configurations, users, etc., even within systems of a common computing platform. This potential for significant variation within computing systems of a common platform can, in turn, introduce large amounts of complexity to testing such systems that can render exhaustive system testing practically infeasible, e.g., within a useful or reasonable timeframe.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a system is described herein. The system can include a memory that stores executable components and a processor that executes the executable components stored in the memory. The executable components can include a filtering component that filters data relating to respective computing system deployments collected from respective computing systems based on relevance of the respective computing system deployments to a system testing criterion, resulting in a filtered group of computing system deployments. The executable components can further include a clustering component that associates respective ones of the filtered group of computing system deployments with respective system clusters according to a difference function that is defined with respect to respective properties of the respective ones of the filtered group of computing system deployments. The executable components can also include a selection component that designates respective selected ones of the filtered group of computing system deployments for testing from respective ones of the system clusters according to the selection criterion.

In another aspect, a method is described herein. The method can include filtering, by a first system operatively coupled to a processor, data relating to deployments of respective second systems as collected from the respective second systems, wherein the filtering is based on relevancy of the deployments to a testing criterion and results in a filtered group of deployments; grouping, by the first system, respective ones of the filtered group of deployments into respective clusters according to a difference function, the difference function being defined according to respective properties of the respective ones of the filtered group of deployments; and designating, by the first system, selected ones of the filtered group of deployments from respective ones of the clusters for testing according to a selection criterion.

In an additional aspect, a non-transitory machine-readable medium including executable instructions is described herein. The instructions, when executed by a processor, can facilitate performance of operations including filtering, according to a filtering criterion, data relating to deployments of respective computing systems as collected from the respective computing systems, resulting in a filtered group of deployments; assigning respective ones of the filtered group of deployments into respective clusters according to a difference function that is based on respective properties of the respective ones of the filtered group of deployments; and selecting one or more designated deployments from respective ones of the clusters according to a selection criterion.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

The present disclosure provides techniques, e.g., as implemented via systems, methods, and/or computer program products, that facilitate the selection of deployments of a computer system (e.g., as implemented by one or more computing devices, such as computing devices logically arranged in a cluster or other grouping, that run a system of software) for mocking, e.g., in a test lab or other suitable environment, for purposes of testing.

As noted above, a computing system or platform, such as a network attached storage (NAS) platform or the like, can be associated with a user base that is sufficiently large (e.g., on the order of thousands or more users depending on the platform) to render exhaustive testing of every user configuration associated with the platform technically infeasible. As a result, various aspects described herein can enable a system developer to select a subset of the user base (e.g., N deployments within the user base for a value of N that is based on the testing resources at the disposal of the system developer) that collectively represents a maximal proportion of that user base.

By implementing deployment selection for mocking and subsequent testing as described herein, various advantages that can improve the functionality of a computing system can be realized. These advantages can include, but are not limited to, the following. Usage of computing resources (e.g., power consumption, processor cycles, network bandwidth, etc.) associated with compiling data associated with computing system deployments can be reduced. An amount of time associated with selecting computing system deployments for testing, especially from large pools of potential deployments, can be reduced, e.g., to a useful timeframe for purposes of testing and/or other operations. Selected computing system deployments as provided herein can be more representative of the total universe of deployments, enabling testing to be conducted for a wider range of issues and improving software quality. Other advantages are also possible.

Figure 1:
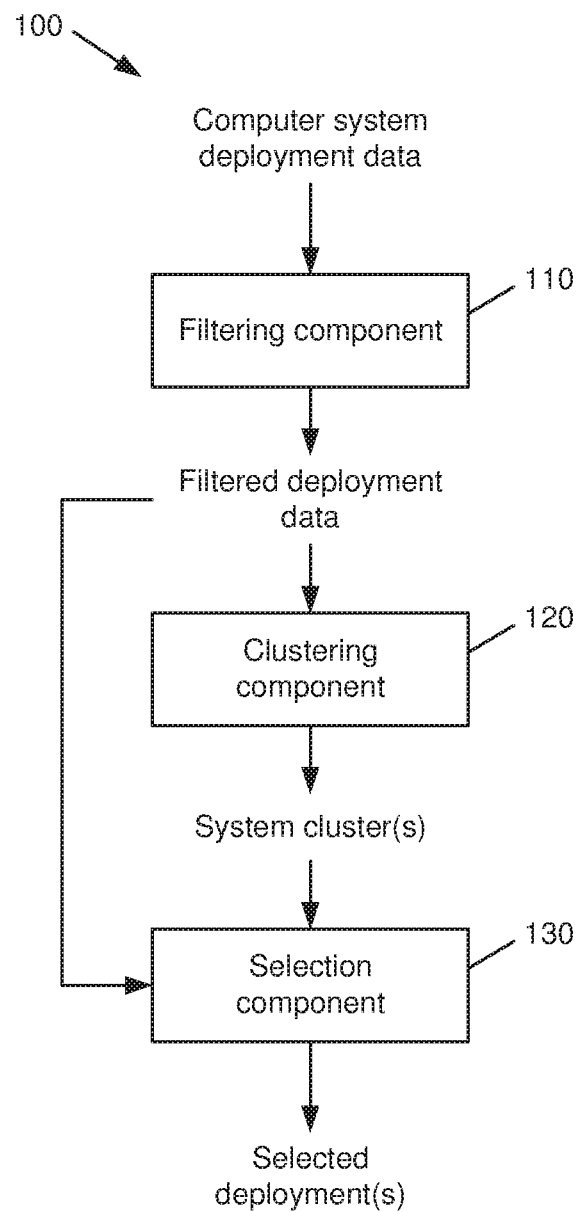
FIG. 1 is a block diagram of a system that facilitates selection of computer system deployments to mock for testing in accordance with various aspects described herein.

With reference now to the drawings, FIG. 1 illustrates a block diagram of a system 100 that facilitates selection of computer system deployments to mock, e.g., for testing, in accordance with various aspects described herein. As shown in FIG. 1, system 100 includes a filtering component 110, a clustering component 120, and a selection component 130, which can operate as described in further detail below. In an aspect, the components 110, 120, 130 of system 100 can be implemented in hardware, software, or a combination of hardware and software. By way of example, the components 110, 120, 130 can be implemented as computer-executable components, e.g., components stored on a memory and executed by a processor. An example of a computer architecture including a processor and a memory that can be used to implement the components 110, 120, 130, as well as other components as will be described herein, is shown and described in further detail below with respect to FIG. 10.

In an aspect, the components 110, 120, 130 can be associated with a computing node and/or other computing device associated with a computing system. Further, the components 110, 120, 130, and/or other components as will be described in further detail below, can be implemented on a same computing device and/or distributed among multiple computing devices.

Returning to FIG. 1, the filtering component 110 of system 100 can filter data relating to respective computing system deployments from respective computing systems associated with those deployments, e.g., a data storage system or the like, as implemented on one or more computing devices that are remote to system 100, based on relevance of the respective computing system deployments to a system testing criterion. Techniques that can be utilized for collecting deployment data are described in further detail below with respect to FIGS. 2-3. Additionally, various system testing criteria that can be utilized by the filtering component 110 are described in further detail below with respect to FIG. 4.

The clustering component 120 of system 100 can associate respective computing system deployments, e.g., deployment represented by filtered deployment data obtained from the filtering component 110, with respective system clusters according to a difference function. As used herein, the term "system cluster" refers to a logical grouping of computing systems as generated by the clustering component 120. It should be appreciated that the term "system cluster" is distinct from the term "computing cluster" as also used herein, which refers to a group of communicatively coupled computing devices (nodes) that is utilized to implement a single computing system. In an aspect, the difference function utilized by the clustering component 120 can be defined with respect to respective properties of the deployments represented by the filtered deployment data. Examples of difference functions that can be utilized by the clustering component are described in further detail below with respect to FIG. 5.

The selection component 130 of system 100 can select and/or designate respective computing system deployments, e.g., from the system clusters produced by the clustering component 120, according to one or more selection criteria. Respective computing system deployments selected by the selection component 130 can then be mocked up, e.g., at a test lab, for testing according to one or more techniques for system mocking and/or testing either presently existing or developed in the future. In an aspect, the selection component 130 can utilize merit scoring in connection with selecting respective deployments, as will be described in further detail with respect to FIG. 7.

Figure 2:
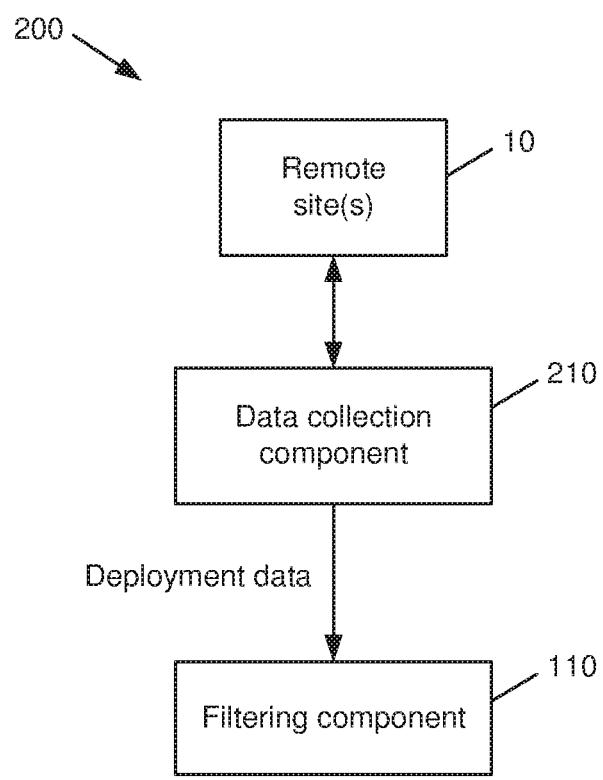
FIG. 2 is a block diagram of a system that facilitates collecting data related to computer system deployments in accordance with various aspects described herein.

With reference next to FIG. 2, a block diagram of a system 200 that facilitates collecting data related to a computer system deployment in accordance with various aspects described herein is illustrated. Repetitive description of like elements employed in other embodiments described herein is omitted for brevity. As shown in FIG. 2, system 200 can include a data collection component 210 that can be utilized to gather and/or otherwise obtain deployment data, e.g., deployment data as used by the filtering component 110, from one or more devices or computing clusters of a remote site 10. This data can include, but is not limited to, physical configuration data associated with the remote site 10, software configuration data associated with software utilized by the remote site 10, environmental interaction data associated with the remote site 10, and/or other suitable types of information.

Figure 3:
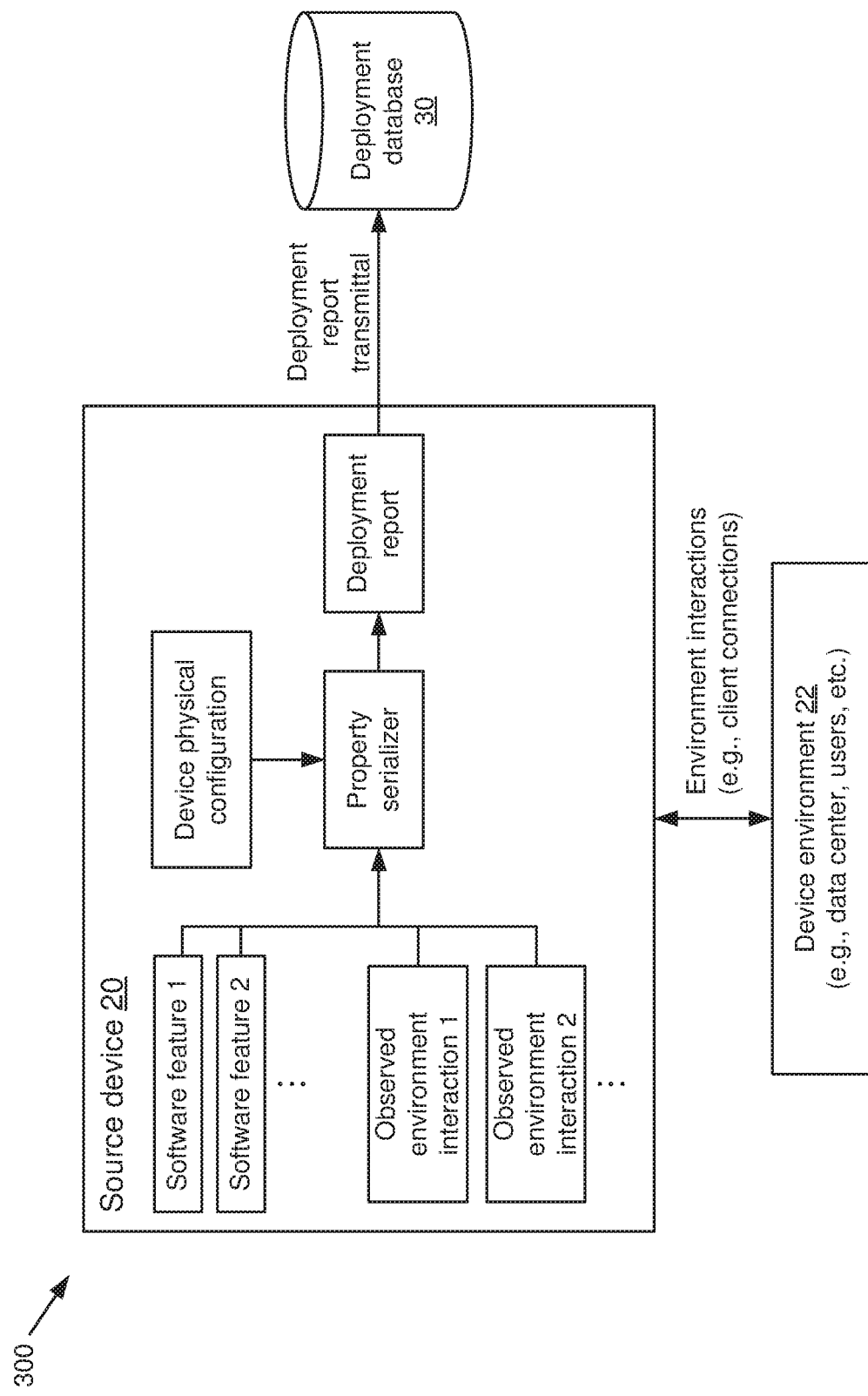
FIG. 3 is a diagram depicting an example model that can be utilized for collecting computer system deployment data in accordance with various aspects described herein.

A specific, non-limiting example of data collection that can be performed by the data collection component 210 is illustrated by diagram 300 in FIG. 3. More particularly, diagram 300 shows an example technique for gathering information about the deployment of a device, referred to in diagram 300 as a source device 20. The source device 20 can be, e.g., a physical device that is manufactured by a system developer and purchased by a given customer, which can additionally run software created and/or supported by the system developer. Alternatively, the source device 20 can be a customer-supplied device that runs software associated with the system developer. It should be appreciated, however, that the techniques described herein can be utilized for a source device 20 that is owned and/or operated by any appropriate entity.

In an aspect, various forms of information regarding the deployment of the source device 20 can be collected to facilitate re-creation of that deployment, e.g., at a test site.

Further, collection of data as described herein can be performed according to a pre-existing agreement between an operator of the source device 20 and a system testing entity, e.g., through a purchase or license agreement for the source device 20 or its software, and/or pursuant to any other means by which the operator of the source device 20 can provide affirmative consent to data collection.

Diagram 300 illustrates the various forms of deployment information that can be collected, e.g., so that the deployment can be recreated at a mock site. This information can include, but is not limited to, the following:

1) The physical configuration of the source device 20 to be modeled, which can include factors such as drive types, node counts, or the like.

2) The configuration of the software features of the source device 20. By way of non-limiting example, this can include whether inline compression is enabled at the source device 20 and, if so, the compression algorithm(s) used for the compression.

3) Information about the environment 22 of the source device 20 and interactions between the source device 20 and its environment 22, such as client input/output (I/O) activity, external authentication, networking information, or the like.

In an aspect, collection of the above and/or other data relating to the source device 20 and its environment 22 can be provided via an application telemetry system at the source device 20, which can then transmit the data to the data collection component 210 as described above according to any suitable wired and/or wireless communication technologies. As additionally shown by diagram 300, the deployment information can be serialized so that it can be transmitted, e.g., as a deployment report, from the source device 20 to the data collection component 210 within one or more communication signals. Once received by the data collection component 210, the deployment information can be stored in a deployment database 30 and/or another suitable data structure for later retrieval and processing.

Deployment information can be collected from a source device 20 in any suitable manner. For instance, deployment information can be collected periodically, e.g., according to a specified cadence or time interval. Also or alternatively, deployment information can be collected in response to occurrence of a triggering event. As an example, deployment information can be collected at specified points during the process of investigating issues with the deployment of the source device 20. Other schedules and/or events for collecting information could also be used. Additionally, deployment information can be collected and/or transmitted using any suitable telemetry techniques, including those presently existing or developed in the future.

In an aspect, due to the likelihood of receiving deployment information from a given source device 20 multiple times of the course of the operational life of the source device 20, each deployment report and/or other quantum of deployment information collected from the source device 20 can contain a timestamp or other unique identifier. For instance, a deployment report can be assigned a key that includes a customer identifier associated with the source device 20, a cluster globally unique identifier (GUID) associated with the source device, a timestamp, and/or any other suitable information. In an aspect, keys assigned to respective deployment reports can be utilized by the filtering component 110 to filter said deployment reports, e.g., via one or more filters as described below with respect to FIG. 4.

Figure 4:
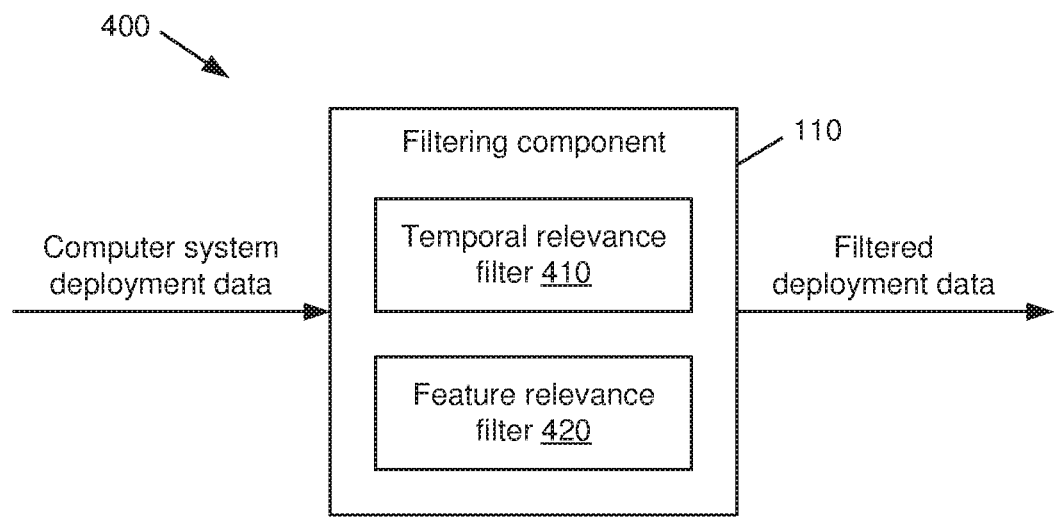
FIG. 4 is a block diagram of a system that facilitates filtering computer system deployment data in accordance with various aspects described herein.

Referring now to FIG. 4, a block diagram of a system 400 that facilitates filtering computer system deployment data in accordance with various aspects described herein is illustrated. Repetitive description of like elements employed in other embodiments described herein is omitted for brevity. As shown in FIG. 4, the filtering component 110 of system 400 can accept computer system deployment data, e.g., corresponding to a universe of all deployments collected by the data collection component 210 and/or stored in a deployment database 30 as described above. In an aspect, the filtering component 110 can apply one or more filters, such as a temporal relevance filter 410 and/or a feature relevance filter 420 as will be described in further detail below, in order to generate a filtered set of deployment data for further processing, e.g., by the clustering component 120 and/or the selection component 130. While the filtering component 110 shown in FIG. 4 includes a temporal relevance filter 410 and a feature relevance filter 420, it should be appreciated that the filtering component 110 could utilize other filters in addition to and/or in place of the illustrated filters 410, 420, e.g., as suitable based on the context of the objectives of a current testing scheme and/or other criteria.

In an aspect, the temporal relevance filter 410 of the filtering component 110 can filter deployment data based on amounts of elapsed time from collection of the respective data. For instance, the temporal relevance filter 410 can filter out all but the latest data gather (e.g., as collected in the manner described above with respect to FIGS. 2-3) for a given computing device or cluster. Also or alternatively, the temporal relevance filter 410 can remove records corresponding to computing devices or clusters that have not reported deployment data within a threshold period of time, e.g., a time period on the order of one or more years. This can be done, for instance, based on a presumption that computing devices that have not reported deployment data in the threshold amount of time are likely no longer online and therefore not relevant to current testing. Other temporal relevance measures could also be employed by the temporal relevance filter 410.

In another aspect, the feature relevance filter 420 of the filtering component 110 can filter deployment data based on usage by respective computing systems of one or more software features that are designated for testing, e.g., as indicated by the deployment data collected from said systems. The feature relevance filter 420 can filter deployment data based on a single feature or set of features, e.g., by filtering out deployments where a given feature is not used. Alternatively, the feature relevance filter 420 can filter deployment data based on combinations of features, e.g., by keeping only deployments where a given feature X is used in combination with another feature Y for some features X and Y. In an aspect, the features associated with the feature relevance filter 420 can be set by a tester or other system user, e.g., to prioritize unique features or combinations of features, features that have recently been updated or are actively being updated, etc.

In addition to the filters 410, 420 shown in FIG. 4, the filtering component 110 can employ other filters as desirable. For instance, the filtering component 110 can filter out data corresponding to deployments that would be infeasible or impractical to mock up, e.g., due to the use of specialized hardware that would be economically prohibitive to recreate and/or other applicable factors. Other filtering criteria could also be used.

Figure 5:
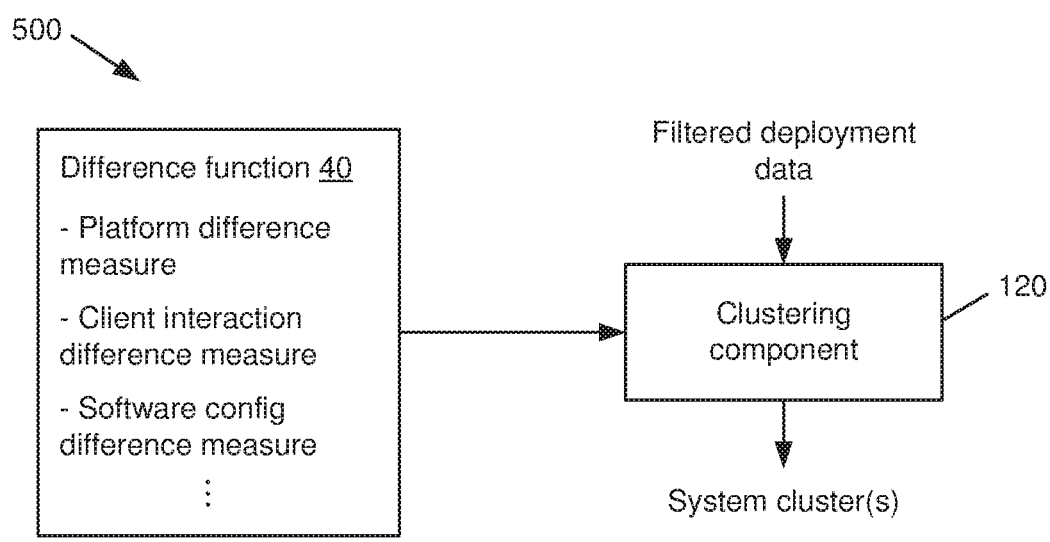
FIGS. 5-6 are block diagrams of respective systems that facilitate clustering computer system deployment data in accordance with various aspects described herein.

Referring now to FIG. 5, a block diagram of a system 500 that facilitates clustering computer system deployment data in accordance with various aspects described herein is illustrated. Repetitive description of like elements employed in other embodiments described herein is omitted for brevity. As described above, the clustering component 120 can utilize a difference function 40 to facilitate the selection of distinct deployments, e.g., for testing, by assigning the respective deployments in deployment data provided as input to the clustering component, e.g., filtered deployment data from the filtering component 110, into respective system clusters. As described in further detail below, the difference function 40 can be defined with respect to client input/output (I/O) volume associated with respective deployments given by the filtered deployment data, configuration properties of software features utilized by the respective deployments, and/or other factors.

In an aspect, the difference function 40 can be utilized to indicate how different two deployments are. Additionally, the difference function 40 utilized by the clustering component 120 can be configured according to one or more criteria. For instance, the difference function 40 can accept a pair of deployments as arguments and return a real number that represents how different the pair of deployments are. Here, a higher number can indicate that the deployments are more distinct. Also or alternatively, the difference function 40 can satisfy the general properties of a distance function, such as the commutative property. Other criteria can also be used.

As shown by FIG. 5, the difference function 40 can compute one or more intermediate difference measures that correspond to respective dimensions along which deployments can vary within the model utilized by the clustering component 120. These can include, but are not limited to, difference measures corresponding to the following:

1) Aspects of the physical platform of a device
2) Aspects of the feature software configurations associated with the device
3) Aspects of interactions between the device and its associated clients, which can include devices utilized for synchronization and/or backup Other difference measures can also be used. In an aspect, non-limiting examples of difference measures that can be utilized by the difference function 40 are described below. It should be appreciated, however, that other difference measures are also possible. It should be further appreciated that while portions of the below examples relate to testing of distributed systems, other system types could be handled by the difference function 40 in a similar manner without departing from the scope of this description.

Platform Difference Measure

In an aspect, the platform difference measure can indicate an amount of difference between physical configurations of two deployments. This can be utilized, for example, in testing scenarios involving a hardware-agnostic software platform. However, for certain test cases, such as system tests in which a given deployment is likely to be replayed on varying platforms at a test lab, the platform difference measure can be omitted or set to a nominal value, e.g., $M_{plat}=0.0$.

Client Interaction Difference Measure

In another aspect, the client interaction difference measure can be assigned based on a common interaction model that is applied to each client protocol as well as to synchronization/backup jobs. The client interaction difference measure can utilize one or more independent dimensions of variability, such as the following: (1) the overall number of I/O operations, per unit time, averaged across nodes, related to a given protocol type, (2) the number of clients of a given protocol type during a typical point in time, or the number of synchronization/backup targets or sources, (3) the percent of nodes in a given computing cluster to which clients can connect, and/or (4) a measure of how evenly a given protocol's load is spread across the nodes to which clients can connect. Other dimensions can also be considered.

In the above cases, a running average (e.g., a 1-day running average) of respective statistics as recorded in the deployment gathers (e.g., as described above with respect to FIGS. 2-3) can be used. These statistics can be calculated for each communication protocol for which statistics are available.

In an aspect, the clustering component 120 can calculate the spread of the protocol load (e.g., according to case (4) above) using calculations that are similar to entropy calculations used for categorical distributions. More particularly, the clustering component 120 can create a tuple with a number of elements equal to the number of nodes to which clients are allowed to connect. Each element of said tuple can correspond to the percentage of the total I/O operations that were serviced by the corresponding node. Based on this structure for a tuple T and a number N of nodes, the spread measure M can be calculated as follows:

$$M = \frac{\sum_{i=1}^{N} T[i] \cdot \log(T[i])}{\sum_{k=1}^{N}\left(\frac{1}{N} \cdot \log\left(\frac{1}{N}\right)\right)} = \frac{\sum_{i=1}^{N} T[i] \cdot \log(T[i])}{\log\left(\frac{1}{N}\right)}$$

In the above, the range of M is (0, 1), where 0.0 represents a perfectly even spread of load among the nodes and 1.0 represents the case where one node services all the load. It should be appreciated that the above calculation is scale (e.g., number of nodes) invariant in order to accommodate potential mocking of deployments on clusters of different sizes.

In an aspect, the clustering component 120 can calculate the absolute value of the percent difference of each of the four measures described above between two deployments and compute their simple average. For instance, for a vector of measures $Mvec_{proto\_x}$ for a given protocol X, this calculation can proceed as provided in the below pseudocode example:

TABLE 1

Pseudocode for example difference measure calculation.

diffvec = $Mvec_{proto\_x1}$ − $Mvec_{proto\_x2}$
pctdiffvec = [ ]
for i in range (len (diffvec) ) :
    pctdiffvec.append ( abs (diffvec [i] / $Mvec_{proto\_x2}$ [i] ) )
$M_{proto\_x}$ = average (pctdiffvec)

In the above example, $M_{proto\_x}$ represents the difference measure for a single protocol X between the two deployments. In an aspect, this can be calculated for all protocols, and an average of these calculations can be taken, which can be represented as a final output $M_{clients}$.

Software Configuration Difference Measure

In an aspect, a software configuration difference measure $M_{cfg}$ can be measured by the clustering component 120 on a per-feature basis with weights applied to each feature. For instance, given a vector of per-feature weights w and difference measures $m_i$ for respective single features, the software configuration difference measure can be calculated as follows:

$$M_{cfg} = \sum_i w[i] \cdot m_i$$

In the above equation, the weights can enable per-feature difference measures to be normalized, since each feature may use a different scale for its measures. Also or alternatively, the weights can express the relative importance of a given feature in defining how different two deployments are.

In an aspect, the weights in the above equation can be chosen via a learning algorithm that is constructed to emphasize respective types of differences between deployments, e.g., according to an objective function. Other techniques could also be used.

Total Difference Measure

Based on the individual difference measures as given above, the clustering component can calculate a total difference measure D as a sum of the individual difference measures, e.g.:

$$D = M_{plat} + M_{clients} + M_{cfg}$$

Figure 6:
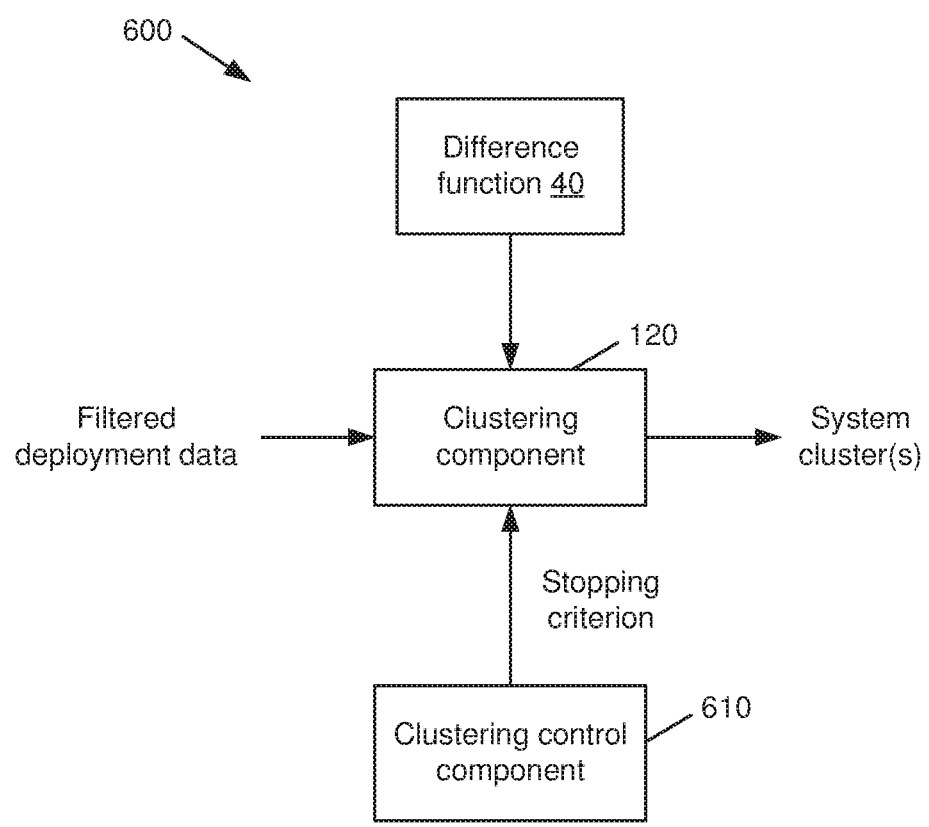

With reference next to FIG. 6, a block diagram of another system 600 that facilitates clustering computer system deployment data in accordance with various aspects described herein is illustrated. Repetitive description of like elements employed in other embodiments described herein is omitted for brevity. In an aspect, the clustering component 120 can utilize a difference function 40 as described above to cluster configurations into M system clusters for a given value of M. In an aspect, the clustering component 120 can utilize a hierarchical agglomerative clustering (HAC) algorithm to generate the M system clusters. It should be appreciated, however, that other clustering techniques could also be used.

As further shown in FIG. 6, system 600 includes a clustering control component 610 that can assign a stopping criterion to the HAC as performed by the clustering component 120. In an aspect, the stopping criterion can be selected in order to ensure a definite end point for clustering, e.g., so that all of the configurations are not placed into a single cluster. In an aspect, the stopping criterion utilized by the clustering control component 610 can be based on a target number of system clusters, e.g., by setting M as given above statically to M=N, where N is the number of configurations to be selected for testing. Also or alternatively, the stopping criterion can be based on a threshold amount of intra-cluster variance between the respective deployments assigned to a cluster, e.g., as given by the difference function 40.

In the latter of the above cases, the clustering control component 610 can be configured to stop further clustering by the clustering component 120 by determining a maximum difference between pairs of points assigned to each system cluster, e.g., using the difference function. If the next iteration of the clustering algorithm outputs a cluster whose variance exceeds the threshold, then this cluster can be discarded and the clustering component 120 can cease further clustering.

In an aspect, the clustering component 120 can perform HAC based on a universe of configurations (e.g., as given by filtered deployment data obtained from the filtering component 110), a difference function 40, a stopping condition given by the clustering control component 610, and some unique way of identifying respective data points, such as an integer index or the like. The result of the HAC algorithm can be the assignment of each configuration provided to the clustering component 120 to a cluster, where each cluster contains similar configurations.

Figure 7:
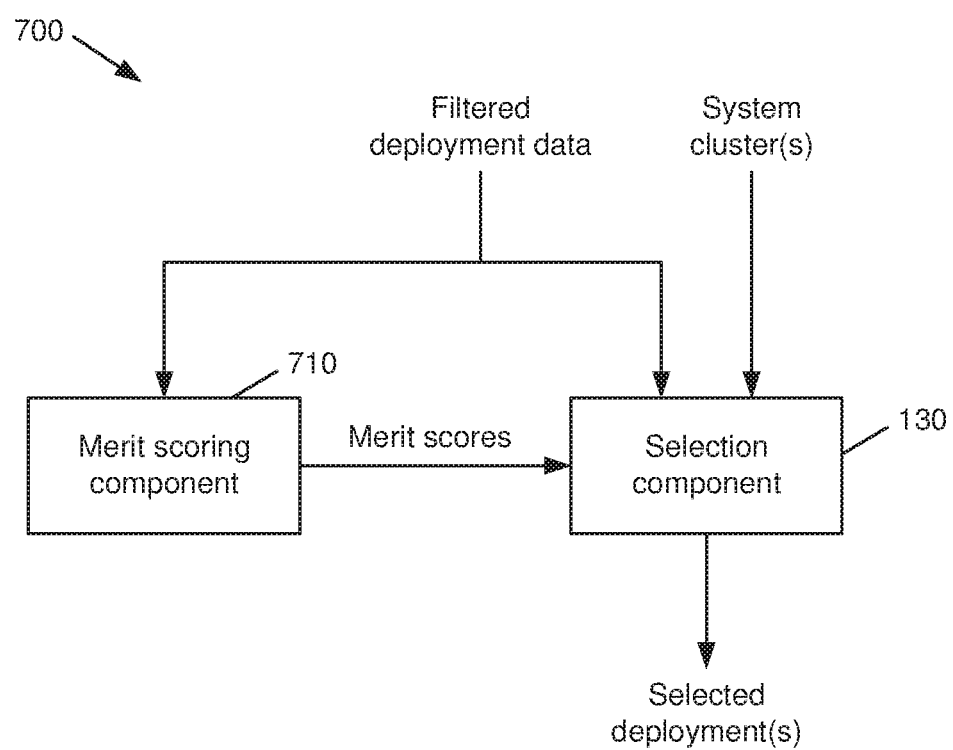
FIG. 7 is a block diagram of a system that facilitates selecting computer system deployments based on merit scores in accordance with various aspects described herein.

Turning to FIG. 7, a block diagram of a system 700 that facilitates selecting computer system deployments based on merit scores in accordance with various aspects described herein is illustrated. Repetitive description of like elements employed in other embodiments described herein is omitted for brevity. In an aspect, the selection component 130 as shown in system 700 can select N configurations for testing by leveraging the configuration cluster assignments made by the clustering component 120 as described above. In general, the selection component 130 can select configurations from respective clusters that are most representative of the other members of the cluster, in addition to other bias criteria.

In an aspect, selection of configurations from respective system clusters can occur as a three-step process:

1) Determining how many configurations to use from each cluster

2) Assigning a figure of merit to each configuration in each cluster

3) Selecting the configuration(s) from each cluster that have the highest figures of merit These steps are described in further detail below.

In various aspects, the selection component can utilize one or more of the following techniques for determining how many configurations to select from each cluster provided by the clustering component 120:

1) Simple round-robin selection starting with an arbitrary cluster. Thus, if the stopping criteria for clustering is M=N, the selection component 130 can simply select one configuration from each cluster.

2) Selecting a number of configurations from respective clusters in proportion to intra-cluster variance (maximal difference). This can be done, e.g., under a presumption that widely-varying clusters need more representation.

3) Selecting a number of configurations from respective clusters in proportion to a sum of bias terms, e.g., from figures of merit. In other words, more selections can be concentrated on clusters that contain higher numbers of configurations, and particularly configurations that belong to computing clusters with a history of escalations, i.e., incidents caused by software bugs or other malfunctions, and/or that appeal to other selection biases.

Other techniques could also be used.

As shown in FIG. 7, system 700 further includes a merit scoring component 710 that assigns merit scores (figures of merit) to respective deployments, e.g., as given by the filtered deployment data provided by the filtering component 110, such that the selection component 130 can select deployments for testing based at least in part on the merit scores. In an aspect, the merit scoring component 710 can apply a figure of merit to a given configuration based on an extent to which that configuration represents the other configurations in its cluster. Mathematically, this can be based on the sum of distances from the given configuration to respective other configurations in the cluster. Using this consideration can result in the central-most configurations in a cluster being favored for selection since said configurations are generally the most representative of the cluster as a whole. Also or alternatively, the merit scoring component 710 can factor in any other biases that are introduced to influence the algorithm to select certain types of configurations. Examples of these biases are discussed further below.

In an aspect, respective considerations utilized by the merit scoring component 710 can be weighted with a set of weights $w_n$, which can collectively be real numbers that are set based on the relative importance of the respective considerations. For instance, bias terms having a positive correlation on selection importance can be given positive weights, while bias terms having a negative correlation can be given negative weights. By way of specific, non-limiting example, an example figure of merit formula is given below, where weights $w_1$, $w_2$ and $w_3$ represent the relative weights given to the respective utilized terms:

$$FigureOfMerit_{config_1} = \\ w_1 * \sum_{n!=1} distance(1, n) + \\ w_2 * numEscalationsInPast\,3\,Years(clusterOf(config_1)) + \\ w_3 * importanceOfCustomer(config_1)$$

In the above example, numEscalationsInPast3Years corresponds to the number of escalations, e.g., related to software bugs, raised for the cluster that the configuration is drawn from. While three years is given as the timeframe in the above, it should be appreciated that any suitable window of time T could be used. This bias is intended to capture the notion that a hyperactive escalation history suggests the cluster has been previously underrepresented in testing. Additionally, importanceOfCustomer represents a quantification of the business importance of a particular configuration, e.g., resulting from business relationships between the system developer and the user of said configuration.

In general, the merit scoring component 710 can assign figures of merit or merit scores to respective configurations based on one or more factors that influence the importance of respective deployments for testing. These factors can include, but are not limited to, the following:

1) Deployments that have a history of malfunctions or other escalated issues, e.g., under the presumption that those deployments represent technically difficult cases.

2) Deployments associated with high-volume and/or otherwise large-scale customers.

3) Deployments having properties that previously have been correlated to quality issues. For example, computing clusters with large node counts, heterogeneous node types, etc. In this case, two bias terms can be used—a first term for the node count of the cluster, and a second term for the count of node hardware platforms in use in the cluster.

4) Deployments utilizing features that are to be updated and/or otherwise changed in an upcoming system release. This can be of particular interest, e.g., if said features are used by a given deployment in a unique way or in a unique combination with other features.

It should be appreciated that the above is a non-exhaustive listing of factors that could be utilized and that other factors are also possible.

Figure 8:
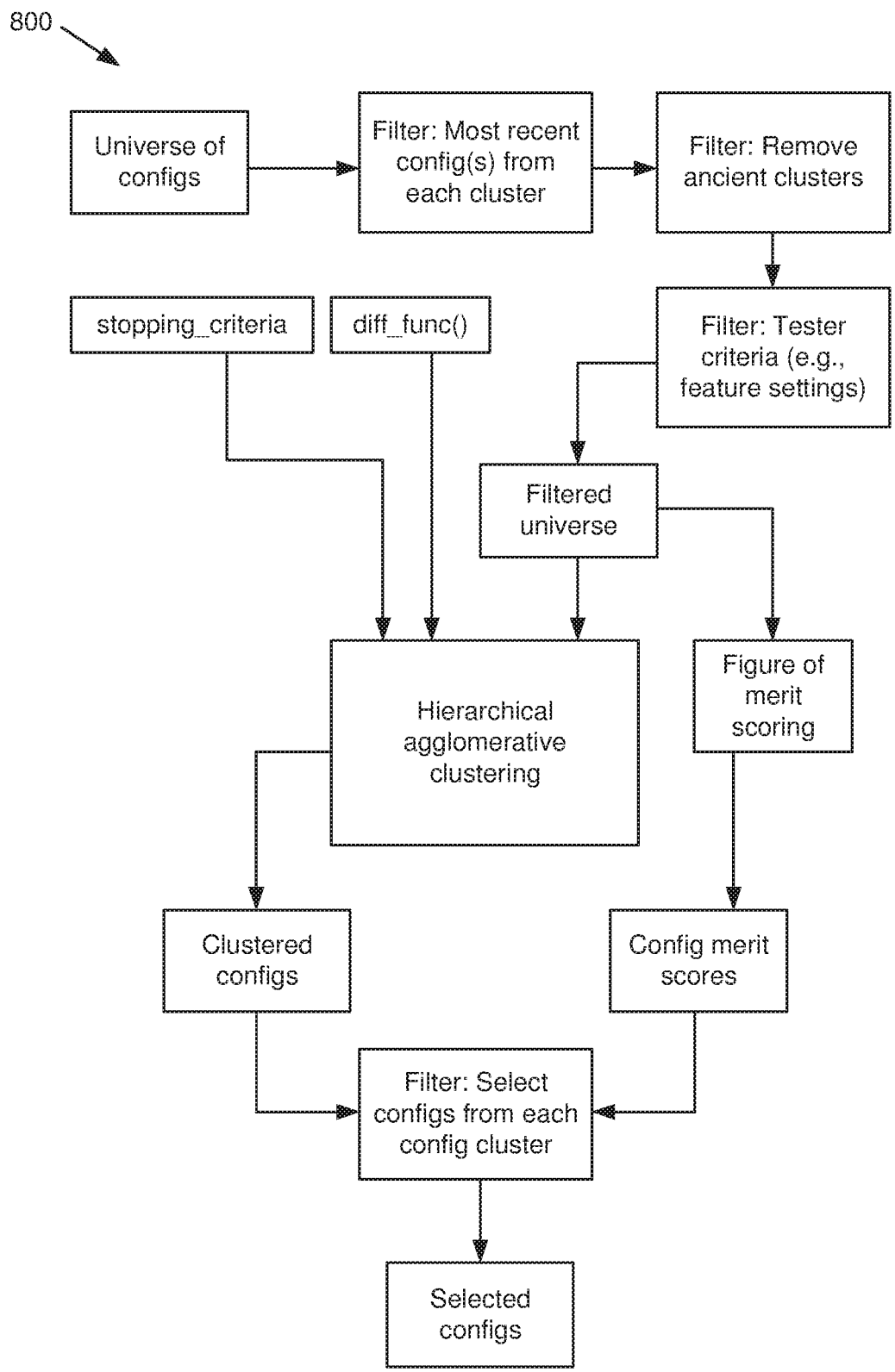
FIG. 8 is a diagram depicting a high-level overview of a technique for selecting computer system deployments to mock for testing in accordance with various aspects described herein.

Referring now to FIG. 8, a diagram 800 depicting a high-level overview of various aspects as described above is provided. As shown in diagram 800, a selection process can begin with a universe of configurations, e.g., as collected via a data collection component 210 from respective source devices 20. One or more filters can then be applied to the universe of configurations, e.g., temporal relevance filters 410 that keep only the most recent configuration from a given source device 20 and/or remove "ancient" configurations (e.g., configurations that were obtained longer ago than a threshold amount of time), feature relevance filters 420 that can be specified according to tester criteria, etc., resulting in a filtered universe of configurations.

The filtered universe of configurations can then be provided to a HAC and/or other suitable clustering algorithm along with stopping criteria and a difference function, e.g., as described above with respect to FIGS. 5-6, to obtain clustered configurations. The filtered universe of configurations can additionally be provided to a figure of merit scoring algorithm (e.g., as implemented via a merit scoring component 710) to obtain merit scores (figures of merit) corresponding to the respective configurations. Based on the configuration clusters and the merit scores, one or more configurations can then be selected, e.g., as described above with respect to FIG. 7.

Figure 9:
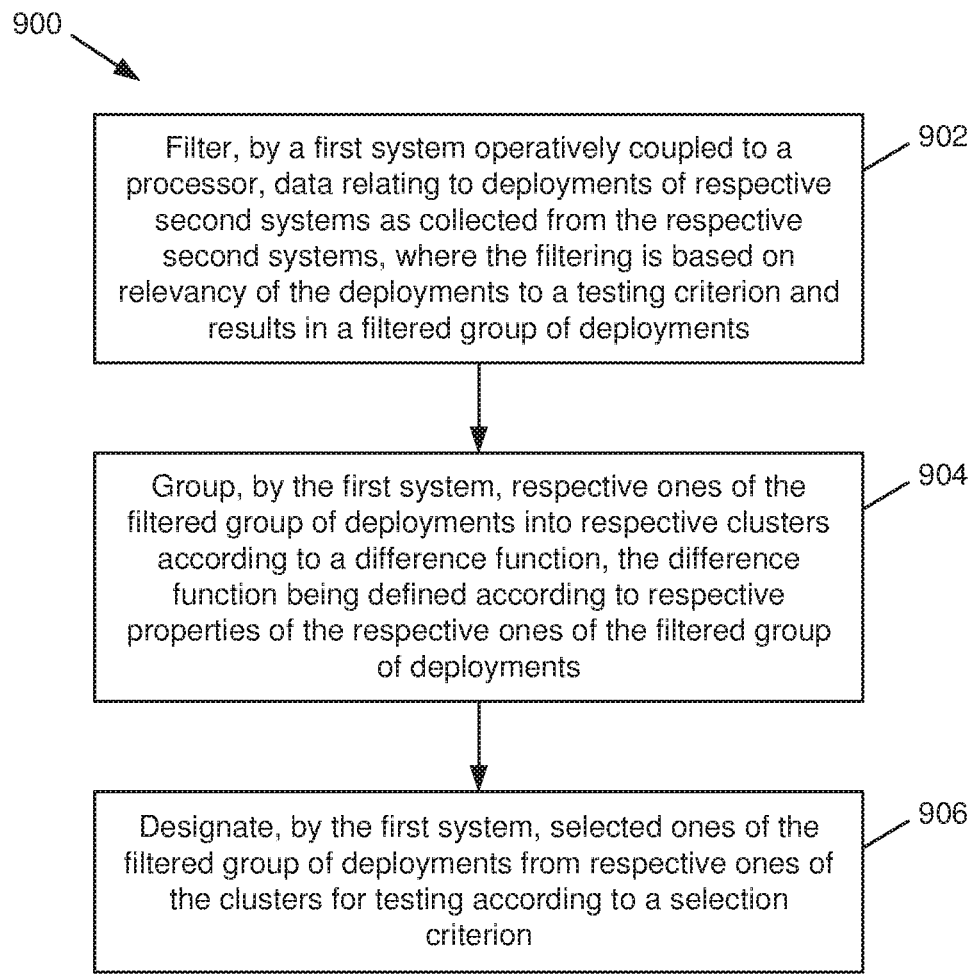
FIG. 9 is a flow diagram of a method that facilitates selection of computer system deployments to mock for testing in accordance with various aspects described herein.

Referring next to FIG. 9, a flow diagram of a method 900 that facilitates selection of computer system deployments to mock for testing in accordance with various aspects described herein is illustrated. At 902, a first system operatively coupled to a processor can filter (e.g., by a filtering component 110) data relating to deployments of respective second systems as collected from the respective second systems (e.g., by a data collection component 210). In an aspect, the filtering performed at 920 can be based on relevancy of the deployments to a testing criterion and result in a filtered group of deployments.

At 904, the first system can group (e.g., by a clustering component 120) respective ones of the filtered group of deployments obtained at 902 into respective clusters according to a difference function (e.g., a difference function 40). In an aspect, the difference function can be defined according to respective properties of the deployments of the filtered group of deployments.

At 906, the first system can designate (e.g., by a selection component 130) selected ones of the filtered group of deployments obtained at 902 from respective ones of the clusters created at 904 according to a selection criterion (e.g., based on merit scores and/or other factors).

FIG. 9 as described above illustrates a method in accordance with certain aspects of this disclosure. While, for purposes of simplicity of explanation, the method has been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 10:
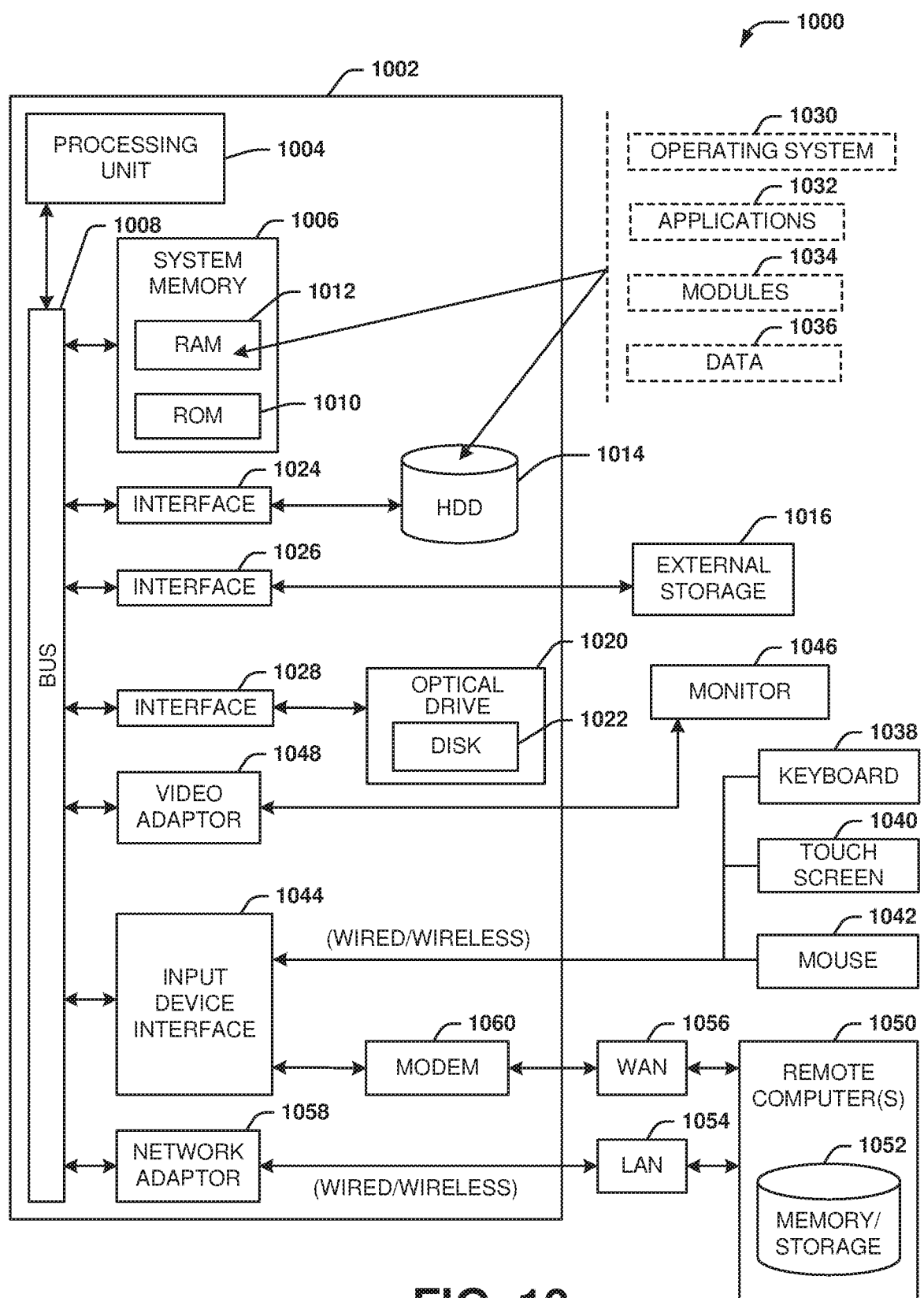
FIG. 10 is a diagram of an example computing environment in which various embodiments described herein can function.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD), a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a memory that stores executable components; and
a processor that executes the executable components stored in the memory, wherein the executable components comprise:
a filtering component that filters data relating to computing system deployments collected from respective computing systems based on relevance of the computing system deployments to a system testing criterion, resulting in filtered computing system deployments;
a clustering component that associates respective ones of the filtered computing system deployments with respective system clusters according to a difference function, the difference function being a distance function that computes intermediate distance measures corresponding to respective variable properties of configurations of the respective ones of the filtered computing system deployments;
a merit scoring component that assigns figures of merit to first ones of the configurations, of first ones of the filtered computing system deployments, based on an extent to which the first ones of the configurations are representative of second ones of the configurations, of second ones of the filtered computing system deployments, the second ones of the filtered computing system deployments being different from the first ones of the filtered computing system deployments and assigned to a same system cluster of the respective system clusters as the first ones of the filtered computing system deployments, as determined using a sum of distances between first intermediate distance measures, of the intermediate distance measures and associated with the first ones of the configurations, and second intermediate distance measures, of the intermediate distance measures and associated with the second ones of the configurations; and
a selection component that designates respective selected ones of the filtered computing system deployments for testing from respective ones of the respective system clusters based on the figures of merit assigned to the first ones of the configurations.

2. The system of claim 1, wherein the system testing criterion comprises amounts of elapsed time from collection of the data relating to the computing system deployments.

3. The system of claim 1, wherein the system testing criterion comprises a criterion based on usage by the computing system deployments of one or more software features designated for testing.

4. The system of claim 1, wherein the respective variable properties are selected from the group consisting of client input/output activity volume associated with the filtered computing system deployments and configuration properties of software features utilized by the filtered computing system deployments.

5. The system of claim 4, wherein the difference function is a function of a sum of a first difference measure, associated with the client input/output activity volume associated with the filtered computing system deployments, and a second difference measure, associated with the configuration properties of the software features utilized by the filtered computing system deployments.

6. The system of claim 1, wherein the clustering component associates the filtered computing system deployments with the respective system clusters via hierarchical agglomerative clustering, and wherein the executable components further comprise:
a clustering control component that assigns a stopping criterion to the hierarchical agglomerative clustering performed by the clustering component.

7. The system of claim 6, wherein the stopping criterion is selected from the group consisting of a target number of the respective system clusters and a threshold amount of intra-cluster variance between the configurations of the respective ones of the filtered computing system deployments as determined based on the difference function.

8. The system of claim 1, wherein the merit scoring component assigns a first figure of merit, of the figures of merit, to a computing system deployment, of the filtered computing system deployments, based on historical data relating to malfunctions associated with the computing system deployment.

9. The system of claim 1, wherein the selection component determines a number of the computing system deployments, of the filtered computing system deployments and associated with respective ones of the respective system clusters, to designate for testing in proportion to an amount of intra-cluster variance between the filtered computing system deployments.

10. The system of claim 1, wherein the difference function comprises a weighted sum of feature difference measures for respective software features used by the filtered computing system deployments, and wherein respective ones of the feature difference measures are weighted by per-feature weights for the respective software features.

11. A method, comprising:
 filtering, by a first system operatively coupled to a processor, data relating to deployments of second systems as collected from the second systems, wherein the filtering is based on relevancy of the deployments to a testing criterion and results in filtered deployments;
 grouping, by the first system, respective ones of the filtered deployments into respective clusters according to a difference function, wherein the difference function satisfies properties of a distance function that computes intermediate distances corresponding to respective variable properties of configurations of the respective ones of the filtered deployments;
 assigning, by the first system, respective figures of merit to first configurations, of the configurations and associated with first ones of the filtered deployments, based on an extent to which the first configurations are representative of second configurations, of the configurations and associated with second ones of the filtered deployments, as determined by a sum of distances between first intermediate distances, of the intermediate distances and associated with the first configurations, and second intermediate distances, of the intermediate distances and associated with the second configurations, wherein the second ones of the filtered deployments are not the first ones of the filtered deployments and are grouped into a same cluster of the respective clusters as the first ones of the filtered deployments; and
 designating, by the first system, selected ones of the filtered deployments from respective ones of the clusters for testing based on the respective figures of merit assigned to the first configurations.

12. The method of claim 11, wherein the testing criterion comprises a criterion selected from a group of criteria evaluated with respect to at least one of amounts of elapsed time from collection of the data relating to the deployments of the second systems or usage by the deployments of the second systems of one or more system features designated for testing.

13. The method of claim 11, wherein the respective variable properties are selected from the group consisting of client input/output activity associated with the filtered deployments and configuration properties of software features utilized by the filtered deployments.

14. The method of claim 11, wherein the grouping comprises grouping the filtered deployments into the respective clusters via hierarchical agglomerative clustering, and wherein the method further comprises:
 causing, by the first system, the hierarchical agglomerative clustering to cease in response to satisfaction of a stopping condition.

15. The method of claim 14, wherein the stopping condition comprises a threshold amount of intra-cluster variance being exhibited between the filtered deployments as determined based on the difference function.

16. The method of claim 11, wherein the designating comprises determining a number of deployments, of the filtered deployments and grouped into respective ones of the respective clusters, to designate for testing in proportion to an amount of intra-cluster variance between the filtered deployments.

17. A non-transitory machine-readable medium comprising executable instructions that, when executed by a processor, facilitate performance of operations, the operations comprising:
 filtering, according to a filtering criterion, data relating to deployments of computing systems as collected from the computing systems, resulting in a filtered group of deployments;
 assigning respective ones of the filtered group of deployments into respective clusters according to a difference function that computes intermediate distance measures based on respective variable properties of configurations of the respective ones of the filtered group of deployments;
 assigning figures of merit to first configurations, of the configurations and associated with first deployments of the filtered group of deployments, based on an extent to which the first configurations are representative of second configurations of second deployments, of the filtered group of deployments and assigned to a same cluster of the respective clusters as the first deployments, as determined by a sum of distances between first intermediate distance measures, of the intermediate distance measures and associated with the first configurations, and second intermediate distance measures, of the intermediate distance measures and associated with the second configurations; and
 selecting one or more designated deployments from respective ones of the clusters based on the figures of merit assigned to the first configurations.

18. The non-transitory machine-readable medium of claim 17, wherein the filtering criterion is selected from the group consisting of a first criterion evaluated with respect to amounts of elapsed time from collection of the data relating to the deployments of the computing systems and a second criterion evaluated with respect to usage by the deployments of the computing systems of one or more software features designated for testing.

19. The non-transitory machine-readable medium of claim 17, wherein the respective variable properties are selected from the group consisting of client activity volume associated with the respective ones of the filtered group of deployments and configuration properties of software features utilized by the respective ones of the filtered group of deployments.

20. The non-transitory machine-readable medium of claim 17, wherein the operations further comprise:
 assigning the respective ones of the filtered group of deployments into the respective clusters via hierarchical agglomerative clustering; and ending the hierarchical agglomerative clustering in response to satisfaction of a stopping condition.

* * * * *